Nov. 29, 1960     T. J. POLICASTRO     2,962,333
AUTOMOBILE TOOL TRAY ATTACHMENT
Filed Nov. 15, 1955
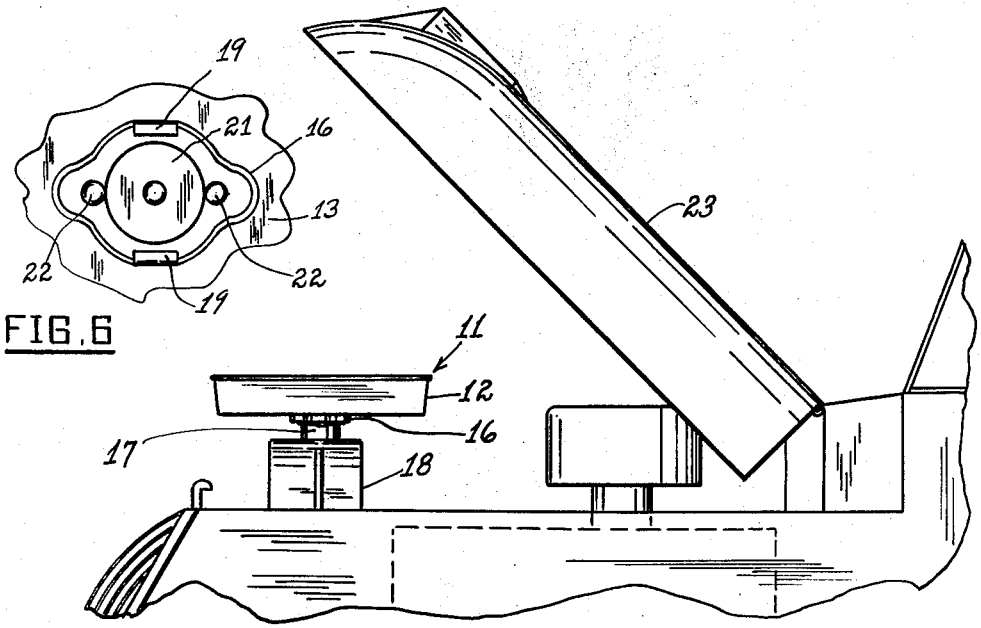
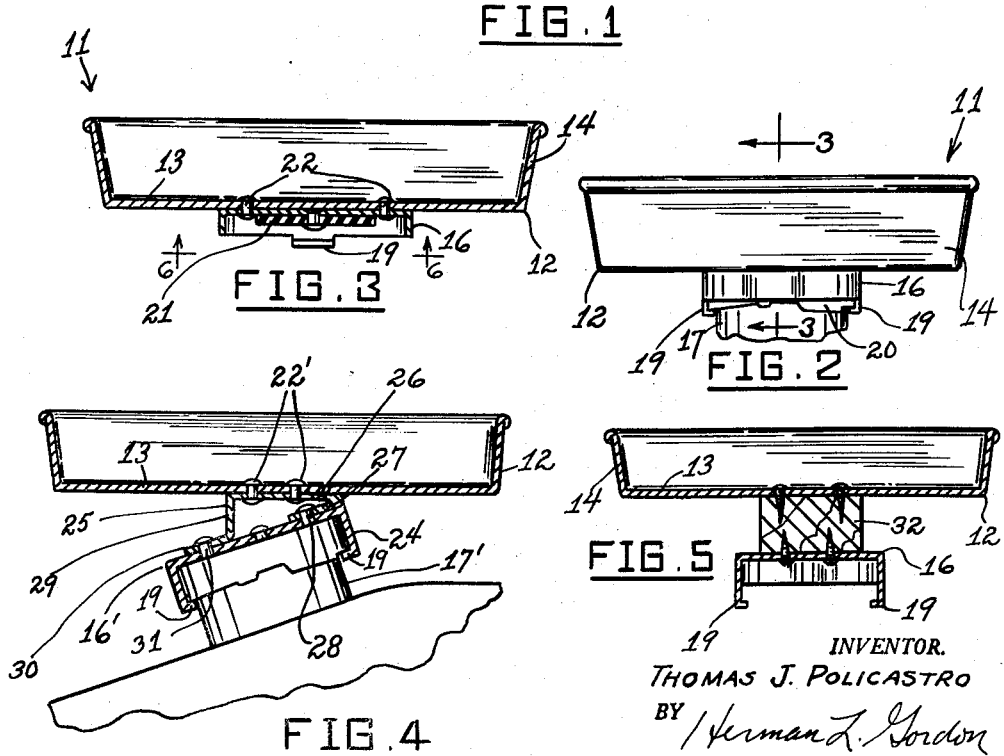
INVENTOR.
THOMAS J. POLICASTRO
BY Herman L. Gordon
ATTORNEY

United States Patent Office 2,962,333
Patented Nov. 29, 1960

2,962,333

AUTOMOBILE TOOL TRAY ATTACHMENT

Thomas J. Policastro, 1108 88th St., North Bergen, N.J.

Filed Nov. 15, 1955, Ser. No. 546,886

4 Claims. (Cl. 311—21)

This invention relates to automobile tray attachments, and more particularly to a mechanic's tool tray adapted to be attached to an automobile adjacent the engine thereof.

A main object of the invention is to provide a novel and improved tool tray attachment for an automobile, adapted to be attached to the neck of the radiator of the automobile in place of the radiator cap, whereby to support the tray member thereof in a convenient position with respect to a mechanic performing work on portions of the automobile located beneath the hood thereof, said tool tray attachment being simple in construction, being easy to mount and dismount, and providing a firm and reliable support for tools required by the mechanic.

A further object of the invention is to provide an improved mechanic's tool tray for automobiles, said tool tray being inexpensive to manufacture, being durable in construction, requiring no modification of the automobile to mount the tray thereon, and being arranged so that it may be rapidly and firmly secured to the automobile in a position especially convenient for performing adjustments or other work on portions of the automobile located beneath the hood thereof.

Further objects and advantages of the invention will become apparent from the following description and claims, and from the accompanying drawings, wherein:

Figure 1 is a fragmentary side elevational view of the forward portion of an automobile, showing a tool tray according to the present invention mounted on the neck of the radiator of the automobile in place of the radiator cap.

Figure 2 is an enlarged front view of the tool tray of Figure 1 and the portion of the radiator neck on which the tray is mounted.

Figure 3 is a vertical longitudinal cross-sectional view taken through the tool tray on the line 3—3 of Figure 2.

Figure 4 is a transverse vertical cross-sectional view taken through a modified form of mechanic's tool tray according to the present invention, adapted to engage on an inclined radiator neck and arranged to support the main tray body in a horizontal position.

Figure 5 is a transverse vertical cross-sectional view taken through another modified form of mechanic's tool tray according to the present invention, wherein an elevating block is provided between the main tray body and the radiator neck-engaging bracket member.

Figure 6 is a bottom plan detail view taken on line 6—6 of Figure 3.

Referring to the drawings, and more particularly to Figures 1 to 3, 11 generally designates an improved automobile mechanic's tool tray according to the present invention. The tray 11 comprises a main tray body 12 of any suitable rigid material, having a bottom wall 13 and the upstanding peripheral wall 14. Centrally secured to the bottom wall 13 is a bracket member 16, formed to engage on the neck 17 of an automobile radiator 18 in place of the radiator cap thereof. Said bracket member 16 is thus formed with opposing depending inturned locking lugs 19, 19, adapted to lockingly interengage with the notched locking skirt 20 on the top end of the radiator neck 17 in the same manner as the locking lugs of the radiator cap.

The bracket member 16 may be provided with a resilient pressure disc 21, of rubber, or similar resilient deformable material, secured to the underside of the top wall of the bracket member, to engage the rim of the radiator neck and to provide upward spring pressure on the bracket member when it is mounted, insuring firm locking contact of the lugs 19, 19 with the locking skirt 20 of neck 17.

The bracket member 16 may comprise a conventional radiator cap rigidly secured to the underside of tray body 12 in any suitable manner, as by a pair of rivets 22, 22, as shown in Figure 3.

In order to mount the tool tray, the mechanic merely removes the automobile radiator cap and engages the bracket portion 16 on the neck 17 of the radiator in place of said cap, rotating the main tray body 12 to cause the bracket lugs 19, 19 to lockingly engage the notched skirt 20 of the neck in the same manner as the normal radiator cap is locked on the neck. This firmly supports the main body 12 of the tray attachment in a convenient position for holding tools required for adjusting or repairing portions of the automobile located beneath the automobile hood, shown at 23 in Figure 1 in elevated position.

In some models of automobiles, the radiator neck is not vertical, but is somewhat inclined to the vertical, as shown at 17' in Figure 4. For this type of situation, the tray body supporting bracket, shown generally at 16', comprises a base member 24, such as a conventional radiator cap, shaped to lockingly engage on the neck of the radiator in place of the normal radiator cap. The main tray body 12 is secured to the top wall of the base member 24 by means of an angled bracket member 25, as shown in Figure 4. Said angled bracket member comprises a top arm 26 which is secured to the underside of the bottom wall 13 of tray body 12 in any suitable manner, as by a pair of rivets 22', 22'. Arm 26 is formed at one end with a flange 27 bent beneath the arm at an acute angle thereto, and secured to the top wall of base member 16' by a rivet 28. At its opposite end, arm 26 is formed with a depending element 29 having a bottom flange 30 aligned with flange 27 and secured to the top wall of base member 16' by a rivet 31.

The inclination of flanges 27 and 29 to arm 26 is substantially the same as the inclination of neck 17' to the vertical, whereby, when the base member 16' is interlocked with the radiator neck 17' in the same manner as the normal radiator cap, the tray body 12 will be mounted in a horizontal position.

In certain models of automobiles the radiator neck is located adjacent to and some distance below the top edge of the front wall of the motor compartment, whereby it is necessary to provide means for supporting the main tray body at a sufficient height to clear the top edge of said front wall. Thus, as shown in Figure 5, an elevating block 32 of substantial height is secured between the bottom wall 13 of the main tray body 12 and the top wall of the bracket member 16, the height of the block 32 being sufficient to provide the required clearance above the top edge of the motor compartment front wall.

Obviously, any suitable tool support or receptacle may be substituted for the tray 12, within the spirit of the present invention, the tool support or tool receptacle being thus supported in a convenient position for holding tools required for adjusting or repairing portions of the automobile located beneath the hood thereof.

While certain specific embodiments of an improved automobile mechanic's tool tray attachment have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A tool supporting attachment to hold tools for work under the hood of an automobile comprising in combination, a tray member of substantial horizontal area adapted to receive mechanic's tools, a bracket member rigidly secured to horizontally spaced portions of the bottom of said tray member, and a plurality of spaced opposing inturned locking lugs depending from said bracket member and being arranged substantially the same as the locking lugs of a radiator cap, said inturned lugs being lockingly interengageable with the notched locking skirt on the neck of an automobile radiator in place of the radiator cap thereof and being formed and arranged to support said tray member in a substantially horizontal position under the automobile hood when the hood is open.

2. A tool supporting attachment to hold tools for work under the hood of an automobile comprising in combination, a tray member of substantial horizontal area adapted to receive mechanic's tools, a cap member rigidly secured to horizontally spaced portions of the underside of the bottom wall of said tray member, and a pair of spaced opposing depending lug elements on said cap member, said lug elements having inturned opposing portions at their lower ends and being arranged substantially the same as the locking lugs of a radiator cap, said lug elements being lockingly interengageable with the notched locking skirt on the neck of an automobile radiator in place of the radiator cap thereof and being formed and arranged to support the tray member in a substantially horizontal position under the automobile hood when the hood is open.

3. A mechanic's tool supporting device comprising a main tray member having a substantially flat bottom wall, and a plurality of spaced, depending, opposed inturned locking lugs rigidly secured to horizontally spaced portions of said bottom wall and being arranged substantially the same as the locking lugs of a radiator cap, said inturned lugs being lockingly interengageable with the notched skirt on the neck of an automobile radiator in place of the radiator cap thereof and being formed and arranged to support said main tray member in a substantially horizontal position under the automobile hood when the hood is open.

4. A tool supporting attachment for an automobile comprising in combination, a tool tray of substantial horizontal area adapted to receive mechanic's tools, and means rigidly secured to horizontally spaced portions of said tray member and including a plurality of spaced, depending, opposing inturned locking lugs arranged substantially the same as the locking lugs of a radiator cap, said inturned lugs being lockingly interengageable with the notched locking skirt on the neck of an automobile radiator in place of the radiator cap thereof and being formed and arranged to support said tray member in a substantially horizontal position under the automobile hood when the hood is open.

References Cited in the file of this patent

UNITED STATES PATENTS

| | | |
|---|---|---|
| 1,647,330 | Albers | Nov. 1, 1927 |
| 1,653,897 | Farr | Dec. 27, 1927 |
| 1,674,823 | Griffiths | June 26, 1928 |
| 1,761,218 | Lundy et al. | June 3, 1930 |
| 1,836,405 | Siemann | Dec. 15, 1931 |
| 1,978,577 | Harris | Oct. 30, 1934 |
| 2,164,478 | Smith | July 4, 1939 |
| 2,465,895 | March | Mar. 29, 1949 |
| 2,805,778 | Yordi | Sept. 10, 1957 |
| 2,827,556 | Kersey | Mar. 18, 1958 |
| 2,884,215 | Weidner | Apr. 28, 1959 |